United States Patent
Konno et al.

[11] Patent Number: 5,900,990
[45] Date of Patent: May 4, 1999

[54] ZOOM LENS SYSTEM

[75] Inventors: Kenji Konno; Masashi Isono, both of Osaka, Japan

[73] Assignee: Minolta Co., Ltd., Osaka, Japan

[21] Appl. No.: 08/658,412

[22] Filed: Jun. 5, 1996

[30]  Foreign Application Priority Data

Jun. 13, 1995 [JP] Japan ................................. 7-146275

[51] Int. Cl.⁶ ................................................ G02B 15/14
[52] U.S. Cl. .......................................................... 359/692
[58] Field of Search ............................. 359/689, 690, 359/692, 683

[56]  References Cited

U.S. PATENT DOCUMENTS

| | | |
|---|---|---|
| 5,218,478 | 6/1993 | Itoh . |
| 5,327,290 | 7/1994 | Fukushima et al. .................... 359/692 |
| 5,386,321 | 1/1995 | Kawamura ............................. 359/692 |
| 5,541,773 | 7/1996 | Konno et al. .......................... 359/692 |
| 5,602,676 | 2/1997 | Estelle .................................... 359/692 |
| 5,633,758 | 5/1997 | Ueda ....................................... 359/692 |
| 5,642,231 | 6/1997 | Estelle .................................... 359/692 |
| 5,805,352 | 9/1998 | Kawamura ............................. 359/692 |

FOREIGN PATENT DOCUMENTS

05188293  7/1993  Japan .
05232382  9/1993  Japan .

*Primary Examiner*—Scott J. Sugarman
*Attorney, Agent, or Firm*—Burns, Doane, Swecker & Mathis, LLP

[57]  ABSTRACT

A zoom lens system of the present invention comprises, from the object side, a front lens unit having a positive refractive power and a rear lens unit having a negative refractive power, and performs zooming by changing the spatial distance between the front lens unit and the rear lens unit. The rear lens unit comprises, from the object side, a positive lens and a negative lens, at least one surface of said positive lens being aspherical and the Abbe number and refraction factor of said positive lens being set appropriately.

12 Claims, 12 Drawing Sheets

Fig. 7A
FNO=3.57

Spherical aberration / Sine condition

Fig. 7B
Y'=21.6

Astigmatism

Fig. 7C
Y'=21.6

Distortion

Fig. 8A
FNO=6.07

Spherical aberration / Sine condition

Fig. 8B
Y'=21.6

Astigmatism

Fig. 8C
Y'=21.6

Distortion

Fig. 9A
FNO=10.29

Spherical aberration / Sine condition

Fig. 9B
Y'=21.6

Astigmatism

Fig. 9C
Y'=21.6

Distortion

Fig. 10A
FNO=3.62

Spherical aberration / Sine condition

Fig. 10B
Y'=21.63

Astigmatism

Fig. 10C
Y'=21.63

Distortion

Fig. 11A

FNO=4.91

-0.5   0.5

Spherical    Sine
aberration   condition

Astigmatism

Distortion

Fig. 12A

FNO=6.71

-0.5   0.5

Spherical    Sine
aberration   condition

Astigmatism

Distortion

Fig. 13A

FNO=4.60

Spherical aberration / Sine condition

Astigmatism

Distortion

Fig. 14A

FNO=5.50

Spherical aberration / Sine condition

Astigmatism

Distortion

Fig. 15A
FNO=9.40

Spherical    Sine
aberration   condition

Fig. 15B
Y'=21.63

Astigmatism

Fig. 15C
Y'=21.63

Distortion

Fig. 16A
FNO=4.60

Spherical    Sine
aberration   condition

Fig. 16B
Y'=21.63

Astigmatism

Fig. 16C
Y'=21.63

Distortion

Fig. 17A

FNO=5.50

Spherical aberration / Sine condition

Astigmatism

Distortion

Fig. 18A

FNO=9.40

Spherical aberration / Sine condition

Astigmatism

Distortion

Fig. 21A
FNO=9.40

-0.5  0.5

Spherical   Sine
aberration  condition

Astigmatism

Distortion

Fig. 22A
FNO=4.60

-0.5  0.5

Spherical   Sine
aberration  condition

Astigmatism

Distortion

ZOOM LENS SYSTEM

BACKGROUND OF THE INVENTION

1. Field of the Invention

The present invention pertains to a zoom lens system.

2. Description of the Related Art

A positive-negative two-component zoom lens system that comprises, from the object side, a front lens unit having a positive refractive power and a rear lens unit having a negative refractive power, and that performs zooming by changing the spatial distance between the front lens unit and the rear lens unit has conventionally been well known.

In a positive-negative two-component zoom lens system, the distance between the front lens unit and the rear lens unit changes during zooming, and the object point of the rear lens unit changes. As a result, transverse chromatic aberration fluctuates while zooming. This fluctuation in transverse chromatic aberration tends to increase as the zoom ratio increases. However, since the fluctuation in transverse chromatic aberration during zooming cannot be sufficiently controlled with the conventional positive-negative two-component zoom lens system, the zoom ratio cannot be increased.

SUMMARY OF THE INVENTION

The main object of the present invention is to provide a zoom lens system with a high zoom ratio, in which the fluctuation in transverse chromatic aberration during zooming is sufficiently controlled.

This and other objectives are achieved by a zoom lens system that comprises, from the object side, a front lens unit having a positive refractive power and a rear lens unit having a negative refractive power, and that performs zooming by changing the spatial distance between the front lens unit and the rear lens unit, wherein said rear lens unit comprises, from the object side, a positive lens and a negative lens, at least one surface of said positive lens being aspherical and the Abbe number and refraction factor of said positive lens being set appropriately.

BRIEF DESCRIPTION OF THE DRAWINGS

These and other objects and features of the present invention will be apparent from the following description with reference to the accompanying drawings.

DETAILED DESCRIPTION OF THE PREFERRED EMBODIMENTS

The embodiments of the present invention will be explained in detail below. Tables 1 through 6 show the first through sixth embodiments, respectively. In each embodiment, f represents the focal length of the entire zoom lens system; ri (i=1, 2, 3, . . . ) represents the radius of curvature of the ith lens surface from the object side; di (i=1, 2, 3, . . . ) represents the ith axial distance from the object side; and Ni (i=1, 2, 3, . . . ) and vi (i=1, 2, 3, . . . ) represent the refractive index and the Abbe number with regard to the d-line ($\lambda$=587.6 nm) of the ith lens from the object side, respectively. With regard to items that change due to zooming, values in the shortest focal length condition, the middle focal length condition and the longest focal length condition are shown in that order from the left.

The surfaces marked with asterisks in the radius of curvature column are aspherical in the embodiments. The configuration of an aspherical surface is defined by the following equation (A). D(n) in the aspherical coefficient represents nth power of 10.

$$X(y) = \frac{r}{\varepsilon}\left\{1 - \left(1 - \varepsilon\frac{y^2}{r^2}\right)^{\frac{1}{2}}\right\} + \sum_{i \geq 2} A_i y^i \tag{A}$$

Where,

X: amount of displacement from the reference spherical surface along the optical axis;

y: height in a direction vertical to the optical axis;

r: reference radius of curvature;

$\varepsilon$: quadratic surface parameter; and $A_i$: aspherical coefficient.

Figure 1:
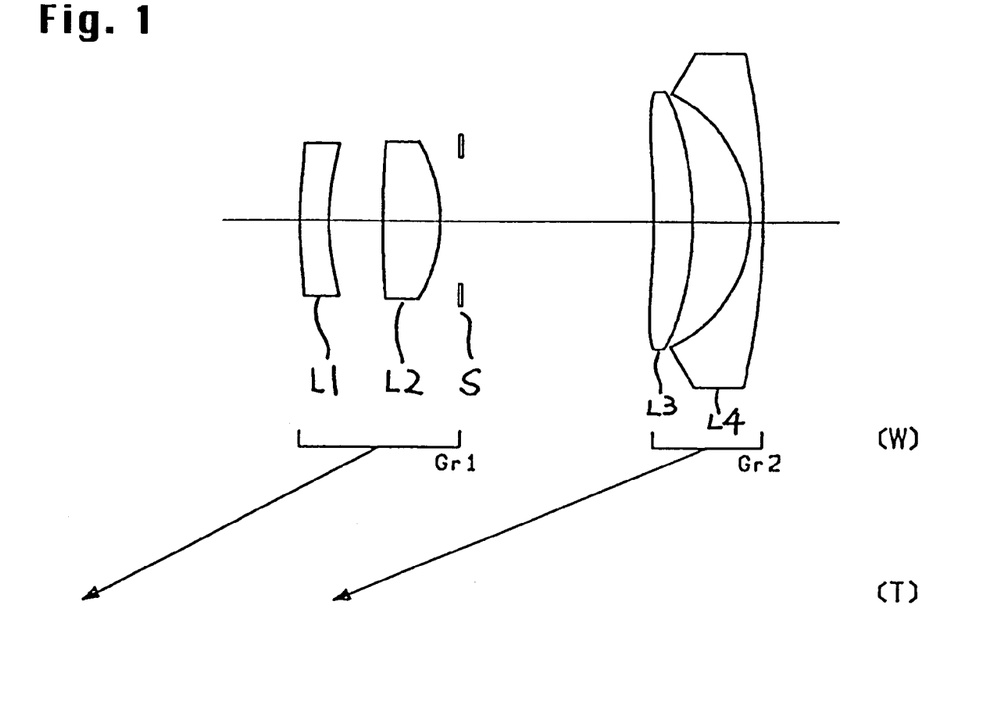
FIG. 1 shows the construction of the lenses in a first embodiment of the present invention.
Figure 2:
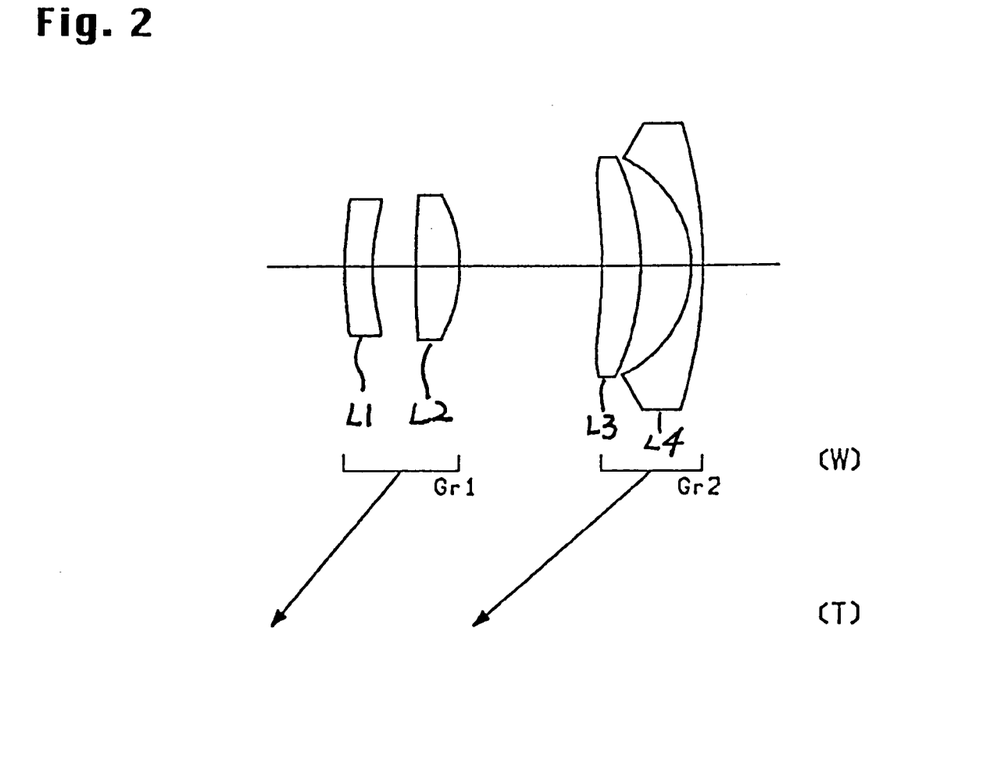
FIG. 2 shows the construction of the lenses in a second embodiment of the present invention.
Figure 3:
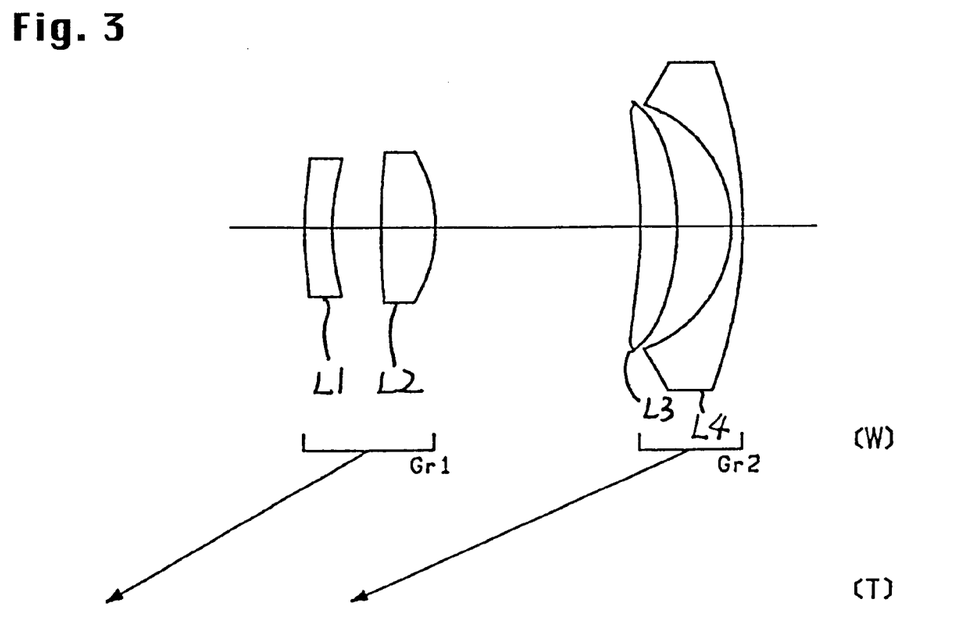
FIG. 3 shows the construction of the lenses in a third embodiment of the present invention.
Figure 4:
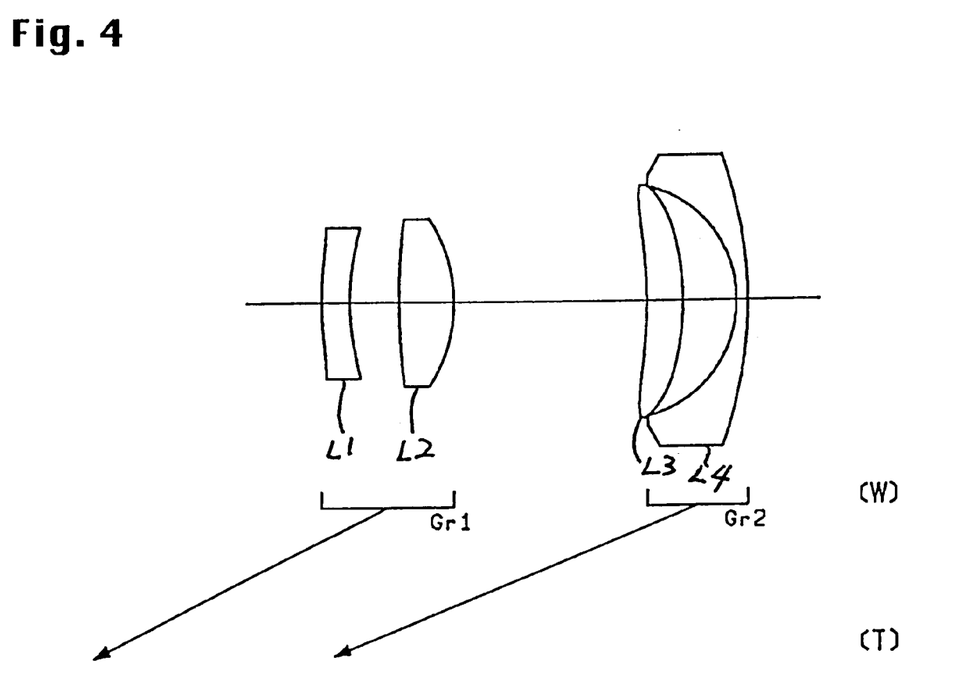
FIG. 4 shows the construction of the lenses in a fourth embodiment of the present invention.
Figure 5:
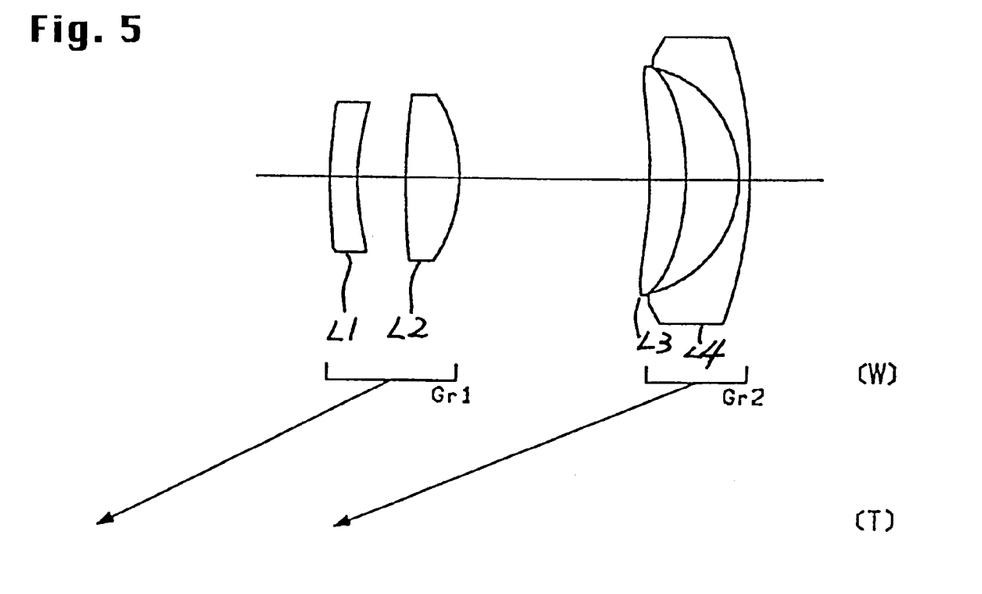
FIG. 5 shows the construction of the lenses in a fifth embodiment of the present invention.
Figure 6:
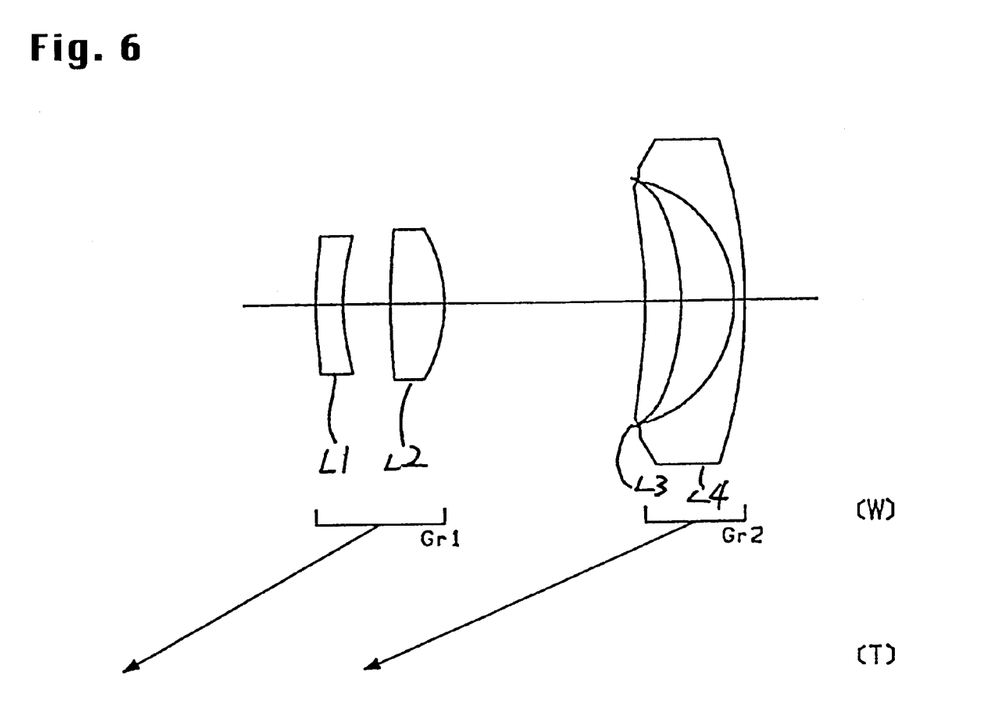
FIG. 6 shows the construction of the lenses in a sixth embodiment of the present invention.

FIGS. 1 through 6 shows the constructions of the lenses of the first through sixth embodiments, respectively, in the shortest focal length condition. They also show the loci of movement of respective lens units during zooming from the shortest focal length condition (W) to the longest focal length condition (T).

The first through sixth embodiments consist of positive-negative two-component zoom lens systems each comprising, from the object side, front lens unit Gr1 having a positive refractive power and rear lens unit Gr2 having a negative refractive power, in which zooming takes place by changing the spatial distance between front lens unit Gr1 and rear lens unit Gr2. Front lens unit Gr1 comprises, from the object side, negative meniscus lens L1 with the convex surface on the object side and lens L2 having convex surfaces on both sides. Rear lens unit Gr2 comprises, from the object side, positive lens L3 having a meniscus configuration with the concave surface on the object side and negative lens L4 having a meniscus configuration with the concave surface on the object side. Positive lens L3 of rear lens unit Gr2 is made of resin (Zeonex).

All of the first through sixth embodiments meet conditions (1), (1') and (2).

$$vd>50 \qquad (1)$$

$$vd>40 \qquad (1')$$

$$nd>1.5 \qquad (2)$$

Where, vd: the Abbe number of the positive lens of the rear lens unit to the d-line; and nd: the refractive power of the positive lens of the rear lens unit to the d-line.

Conditions (1) and (1') are requirements to reduce fluctuation in transverse chromatic aberration. If the lower limit of condition (1') is not met, the fluctuation in transverse chromatic aberration increases, which prevents the zoom ratio from being increased. For example, in the first embodiment, while the primary transverse chromatic aberration coefficient in the shortest focal length condition is a negative '−0.00036 (g-line)', the actual transverse chromatic aberration has a positive value due to the influence of high-order transverse chromatic aberration. The behavior of the high-order transverse chromatic aberration changes depending on the Abbe number of positive lens L3 of the rear lens unit. Therefore, in the present invention, the primary transverse chromatic aberration and the high-order transverse chromatic aberration are balanced by meeting condition (1') shown above such that the fluctuation in transverse chromatic aberration may be reduced, which permits an increased zoom ratio. Where condition (1) is met, the fluctuation in transverse chromatic aberration can be further reduced and therefore the zoom ratio can be increased even further.

Condition (2) controls the refractive power of positive lens L3 of the rear lens unit. If the lower limit of condition (2) is not met, or in other words, if the refractive power of positive lens L3 of the rear lens unit becomes small, the curvature of positive lens L3 must be increased. As a result, low-order aberration coefficients increase and the comatic aberration in particular exceeds the allowable range. In the first through sixth embodiments, aberrations of positive lens L3 are further reduced by having at least one surface of positive lens L3 of the rear lens unit be aspherical. In other words, by causing, by means of the aspherical surface, aberrations opposite to the aberrations caused by the reference spherical surface of positive lens L3, the aberrations caused by the reference spherical surface and the aberrations caused by the aspherical surface are balanced out.

In addition, the zoom lens system of the present invention meets the following conditions (3) and/or (3').

$$fT/fW>1.8 \qquad (3)$$

$$fT/fW>2.6 \qquad (3')$$

Where, fT: the focal length of the entire zoom lens system in the longest focal length condition; and fW: the focal length of the entire zoom lens system in the shortest focal length condition.

These conditions (3) and (3') control the zoom ratio. If the zoom ratio does not meet condition (3), a sufficiently high zoom ratio cannot be said to be obtained. It is even more desirable for the zoom ratio to meet condition (3').

In order to increase the zoom ratio of the zoom lens system, it is preferred that the zoom range be set closer to the telephoto end. In order to set the zoom range closer to the telephoto end, it is preferred that lens L1 closest to the object have a convex surface on the object side. Where lens L1 closest to the object has a convex surface on the object side, the construction of the entire zoom lens system is more or less symmetrical with regard to the aperture, which is also advantageous in compensating for distortion.

By having at least one aspherical surface in the rear lens unit, the occurrence of comatic aberration in the peripheral areas of the screen can be reduced. By having at least one aspherical surface in the front lens unit, spherical aberration in particular can be well compensated for.

When making a lens aspherical, it is preferred that both surfaces of the lens be made aspherical. By doing so, aberrations that cannot be completely compensated for by means of one aspherical surface can be compensated for by means of the other aspherical surface, which makes the aspherical effect described above even more marked.

In the first through sixth embodiments, the front lens unit comprises a negative lens and a positive lens aligned in that order, and the rear lens unit comprises a positive lens and a negative lens aligned in that order. This helps perform compensation for various aberrations, including reduction of the Petzval sum and compensation for chromatic aberration in each lens unit.

In addition, an addition of a lens system having a small refractive power in front of the front lens unit, behind the rear lens unit, or between the front lens unit and the rear lens unit of the zoom lens system pertaining to the present invention will not cause the zoom lens system to deviate from the essence of the present invention. A lens system added in this way should preferably be a lens system having a refractive power whose absolute value is a maximum of one-third of the refractive power of the entire zoom lens system in the longest focal length condition.

Figure 7A:
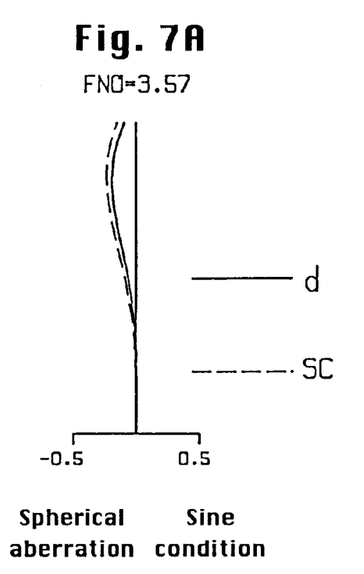
FIGS. 7A, 7B, and 7C show aberrations in the shortest focal length condition regarding the first embodiment.
Figure 7B:
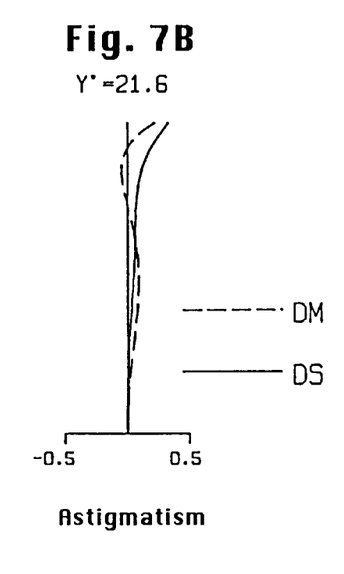
Figure 7C:
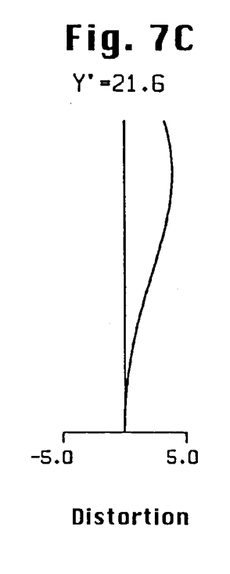
Figure 8A:
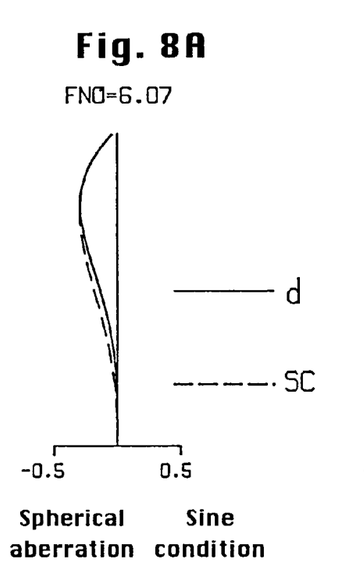
FIGS. 8A, 8B, and 8C show aberrations in the middle focal length condition regarding the first embodiment.
Figure 8B:
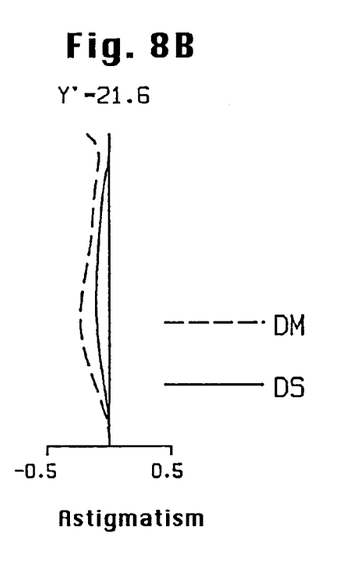
Figure 8C:
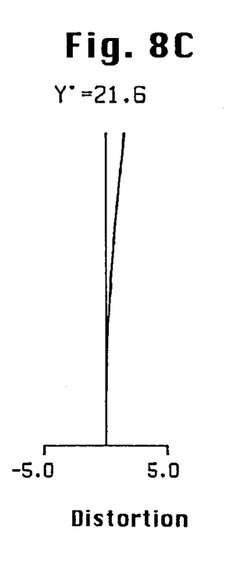
Figure 9A:
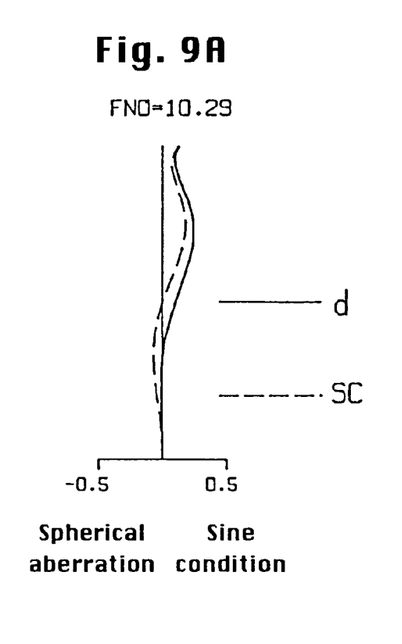
FIGS. 9A, 9B, and 9C show aberrations in the longest focal length condition regarding the first embodiment.
Figure 9B:
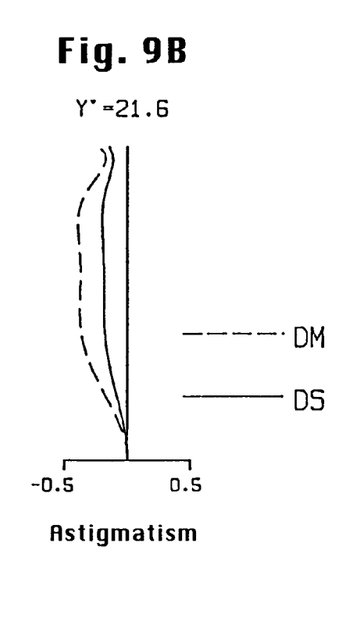
Figure 9C:
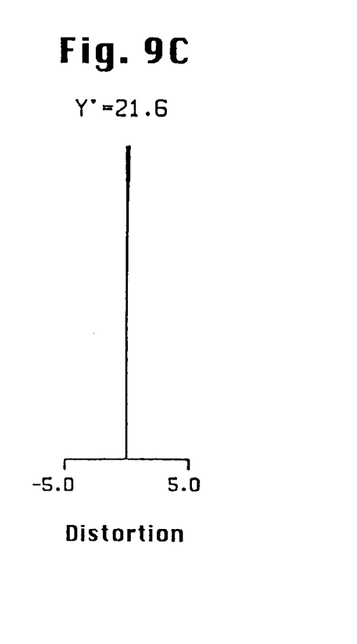
Figures 10A, 10B:
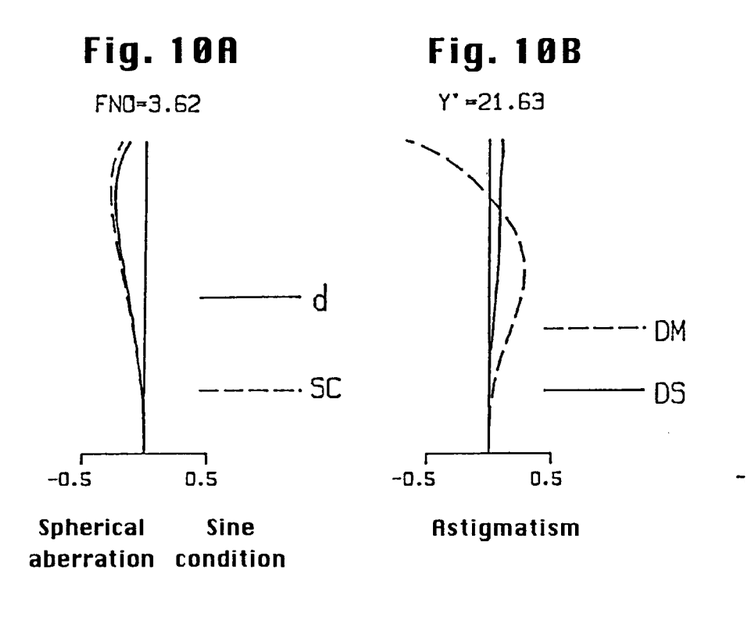
FIGS. 10A, 10B, and 10C show aberrations in the shortest focal length condition regarding the second embodiment.
Figure 10C:
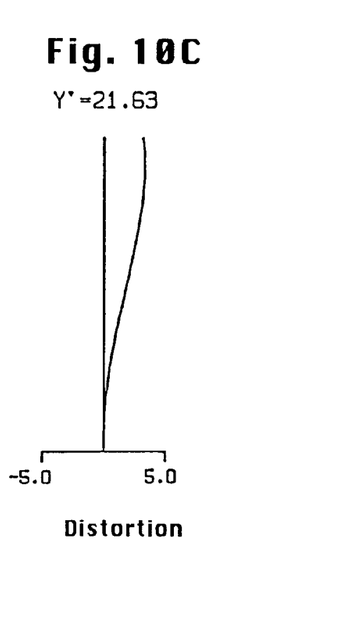
Figure 11A:
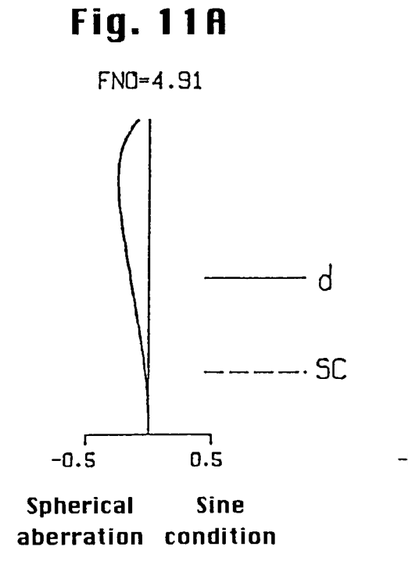
FIGS. 11A, 11B, and 11C show aberrations in the middle focal length condition regarding the second embodiment.
Figure 11B:
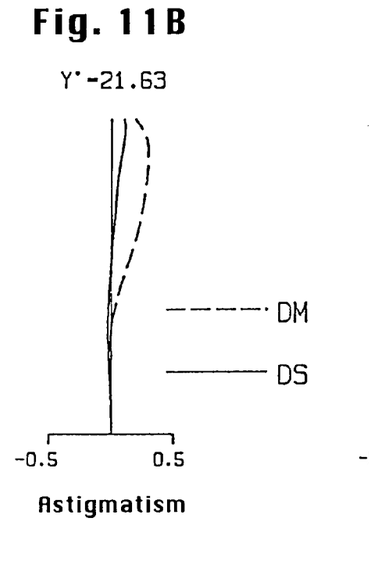
Figure 11C:
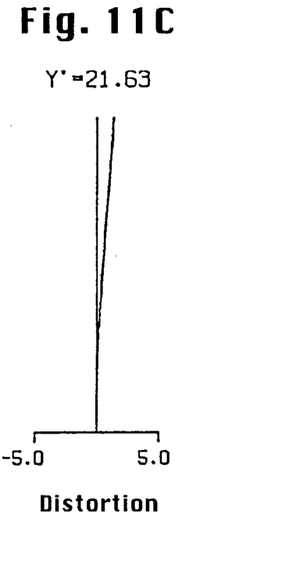
Figure 12A:
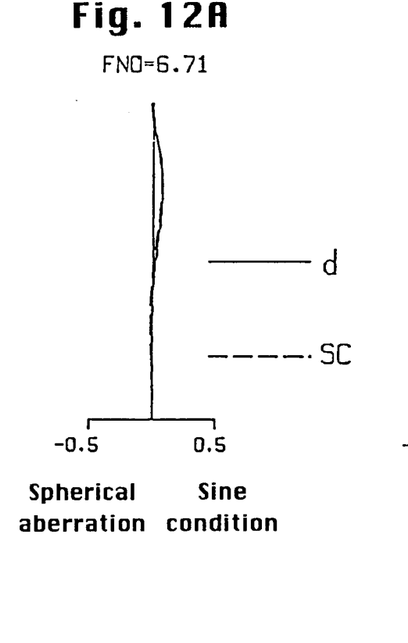
FIGS. 12A, 12B, and 12C show aberrations in the longest focal length condition regarding the second embodiment.
Figure 12B:
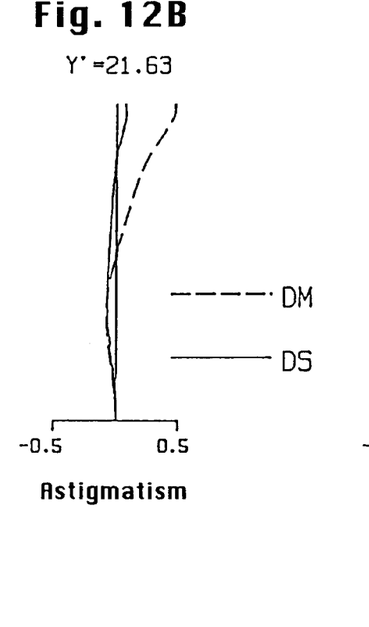
Figure 12C:
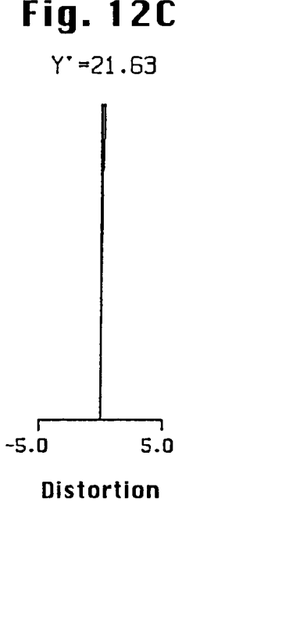
Figure 13A:
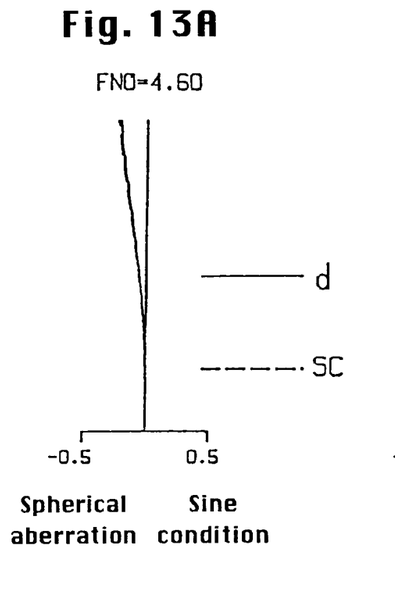
FIGS. 13A, 13B, and 13C show aberrations in the shortest focal length condition regarding the third embodiment.
Figure 13B:
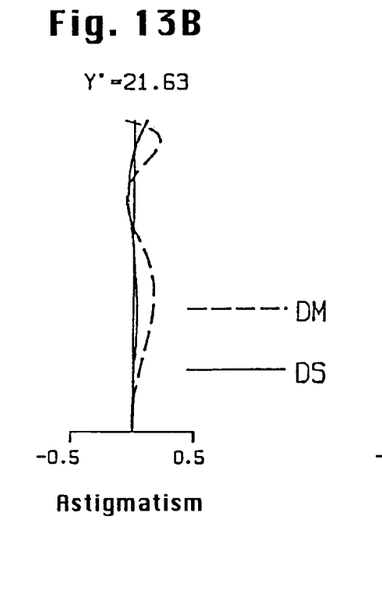
Figure 13C:
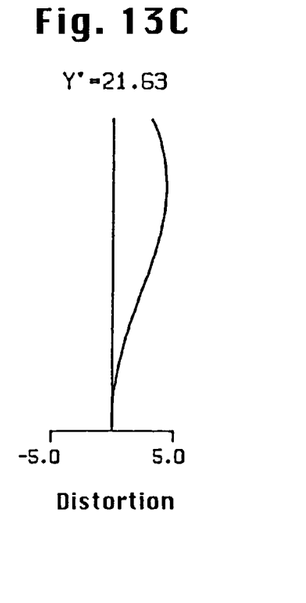
Figure 14A:
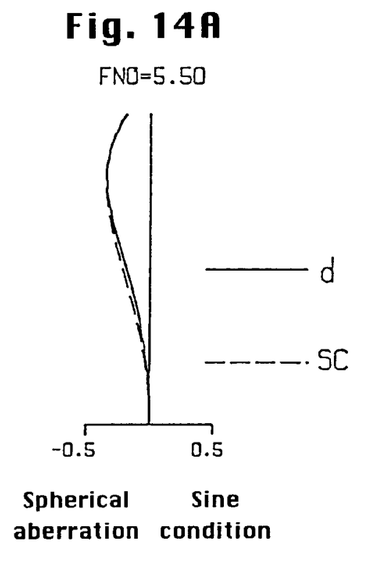
FIGS. 14A, 14B, and 14C show aberrations in the middle focal length condition regarding the third embodiment.
Figure 14B:
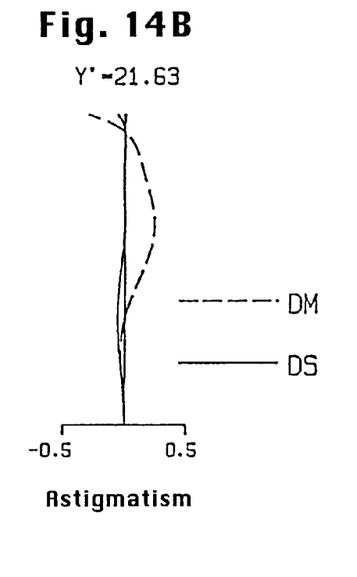
Figure 14C:
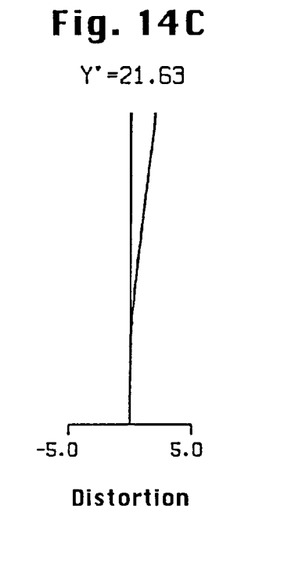
Figure 15A:
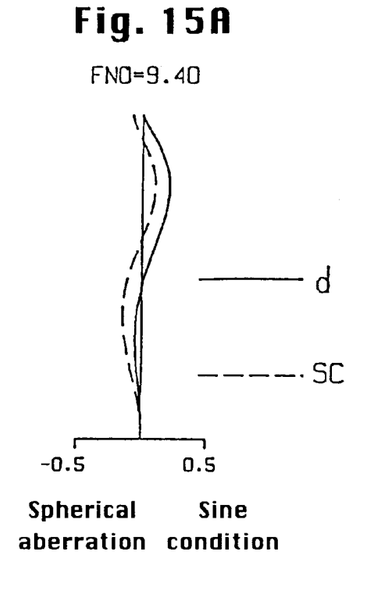
FIGS. 15A, 15B, and 15C show aberrations in the longest focal length condition regarding the third embodiment.
Figure 15B:
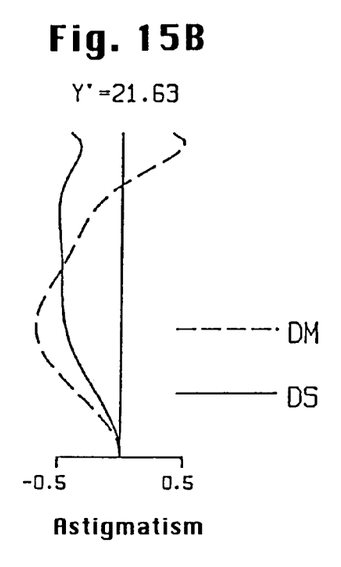
Figure 15C:
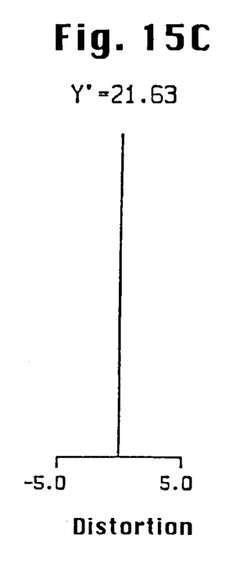
Figure 16A:
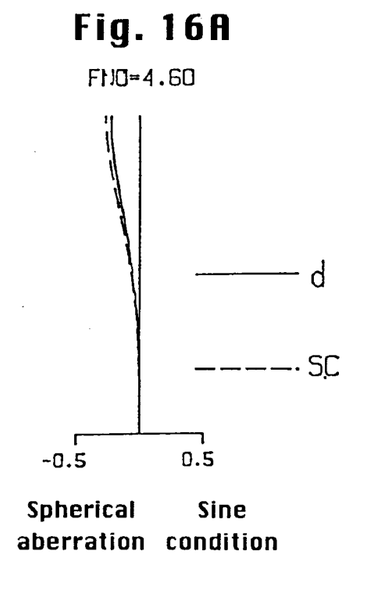
FIGS. 16A, 16B, and 16C show aberrations in the shortest focal length condition regarding the fourth embodiment.
Figure 16B:
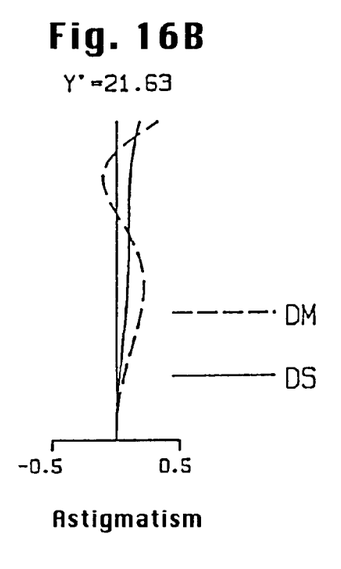
Figure 16C:
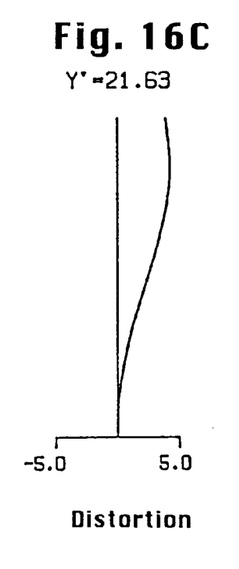
Figure 17A:
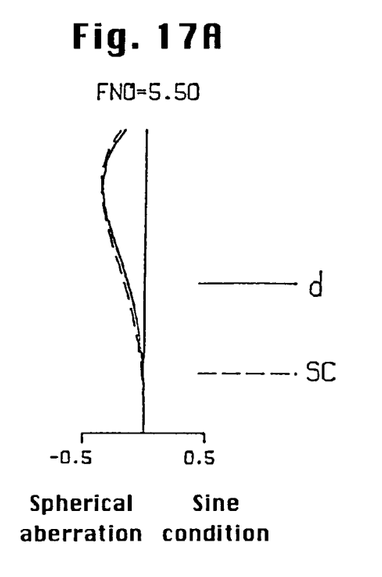
FIGS. 17A, 17B, and 17C show aberrations in the middle focal length condition regarding the fourth embodiment.
Figure 17B:
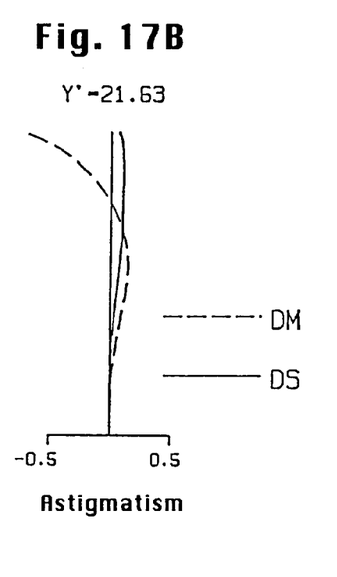
Figure 17C:
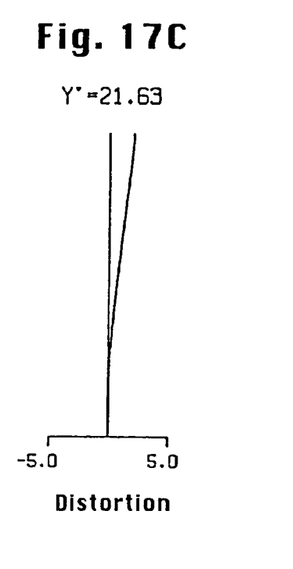
Figure 18A:
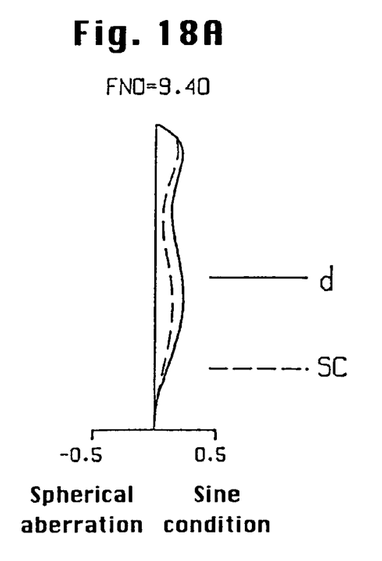
FIGS. 18A, 18B, and 18C show aberrations in the longest focal length condition regarding the fourth embodiment.
Figure 18B:
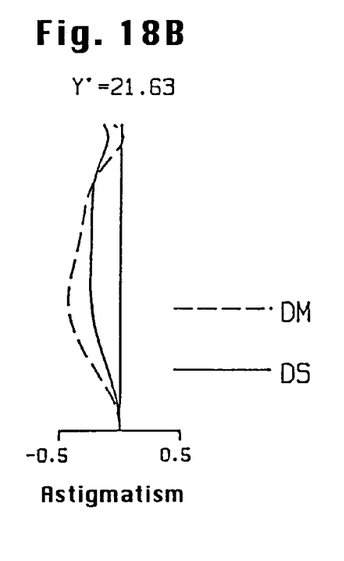
Figure 18C:
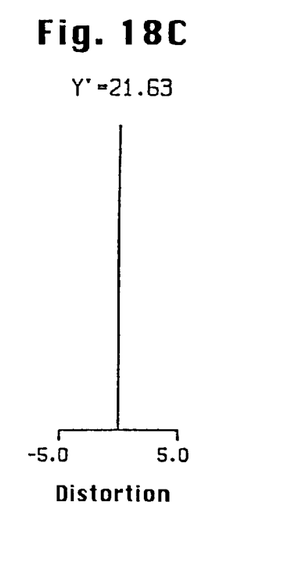
Figure 19A:
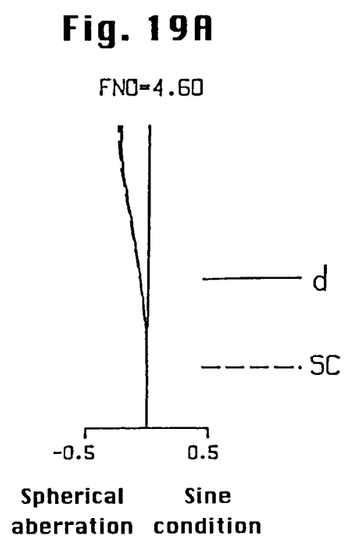
FIGS. 19A, 19B, and 19C show aberrations in the shortest focal length condition regarding the fifth embodiment.
Figure 19B:
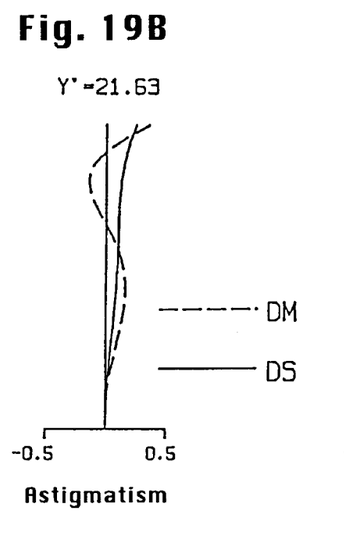
Figure 19C:
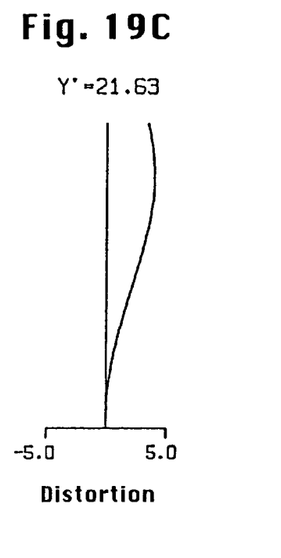
Figure 20A:
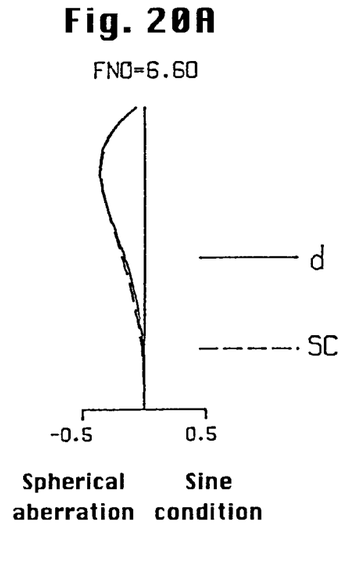
FIGS. 20A, 20B, and 20C show aberrations in the middle focal length condition regarding the fifth embodiment.
Figure 20B:
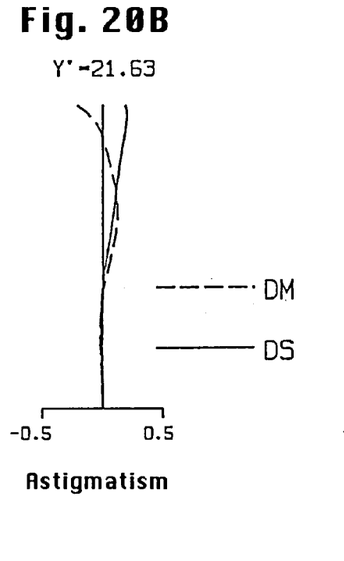
Figure 20C:
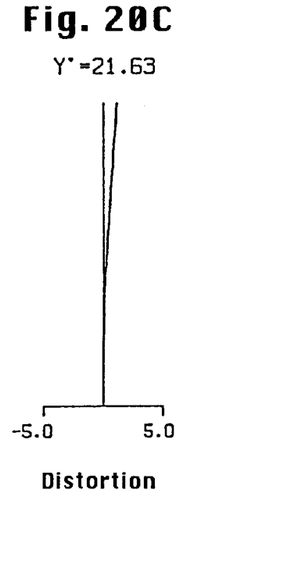
Figure 21A:
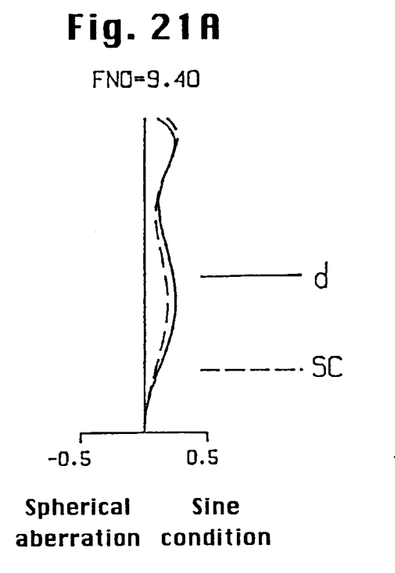
FIGS. 21A, 21B, and 21C show aberrations in the longest focal length condition regarding the fifth embodiment.
Figures 21B, 21C:
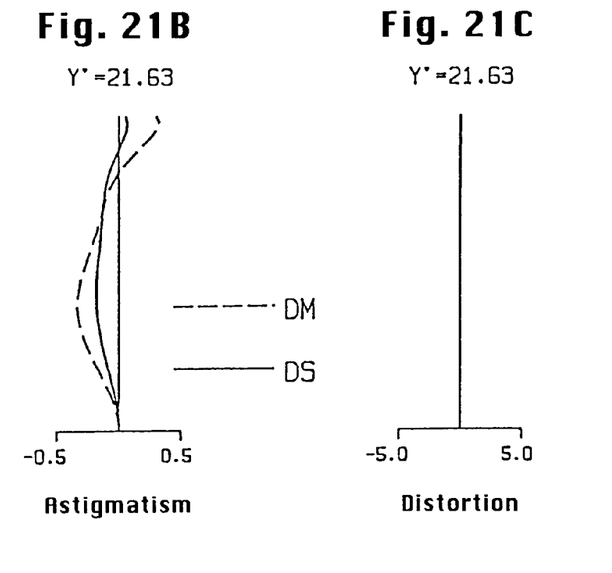
Figure 22A:
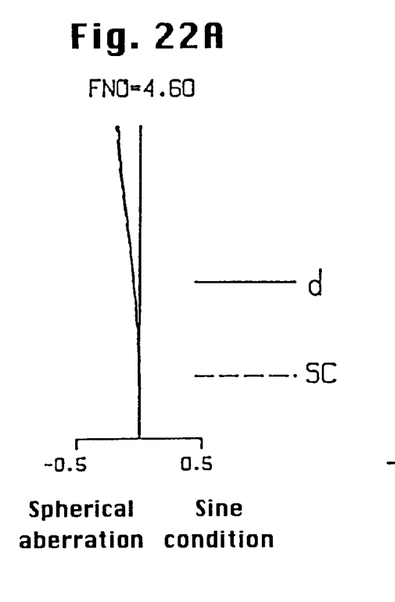
FIGS. 22A, 22B, and 22C show aberrations in the shortest focal length condition regarding the sixth embodiment.
Figures 22B, 22C:
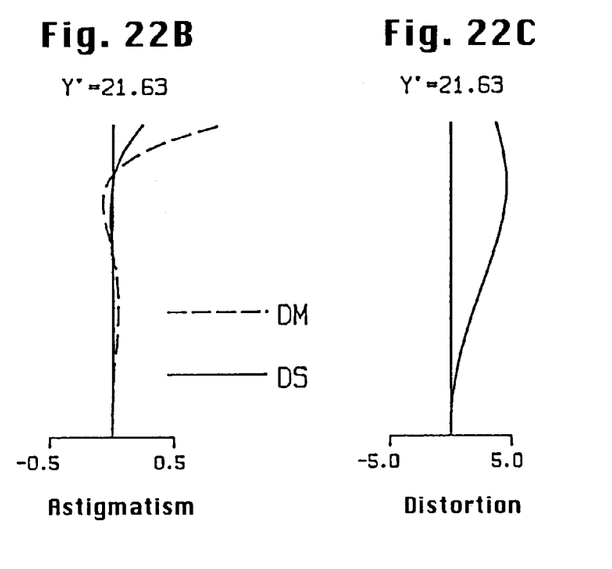
Figures 23A, 23B, 23C:
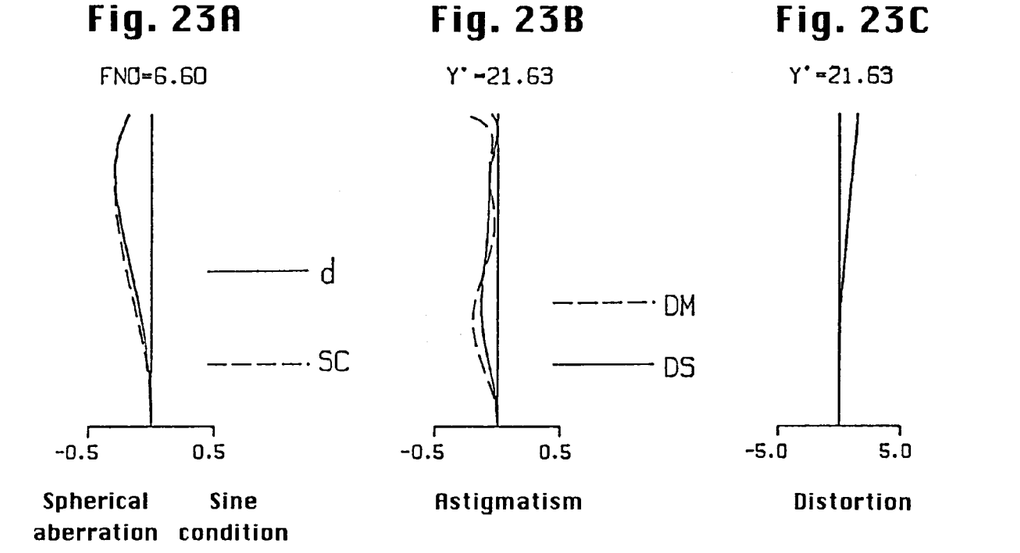
FIGS. 23A, 23B, and 23C show aberrations in the middle focal length condition regarding the sixth embodiment.
Figures 24A, 24B, 24C:
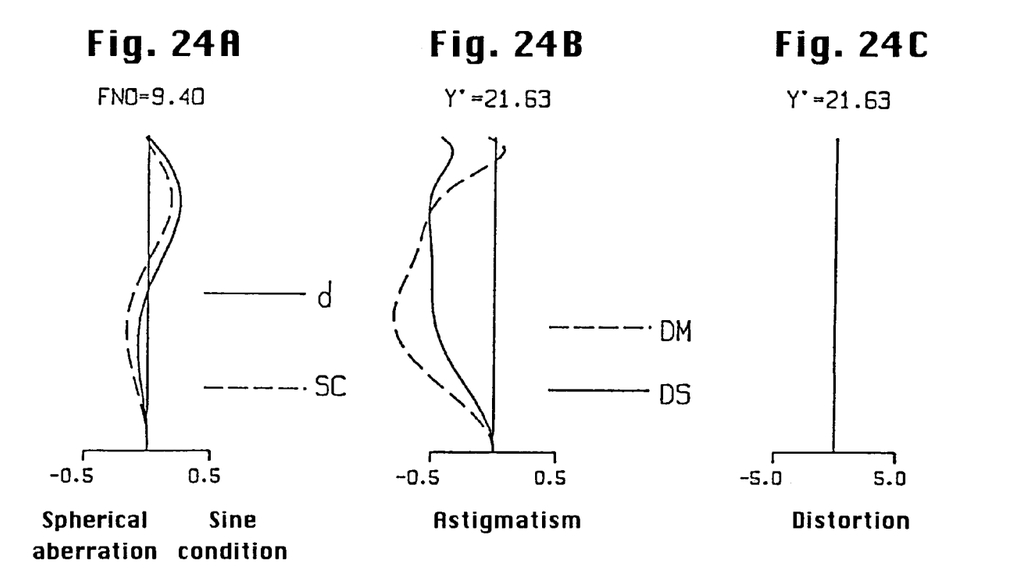
FIGS. 24A, 24B, and 24C show aberrations in the longest focal length condition regarding the sixth embodiment.

FIGS. 7A through 7C, 10A through 10C, 13A through 13C, 16A through 16C, 19A through 19C and 22A through 22C show aberrations of the first through sixth embodiments, respectively, when the zoom lens system is in focus as to an object at infinity using the shortest focal length. FIGS. 8A through 8C, 11A through 11C, 14A through 14C, 17A through 17C, 20A through 20C and 23A through 23C show aberrations of the first through sixth embodiments, respectively, when the zoom lens system is in focus as to an object at infinity using the middle focal length. FIGS. 9A through 9C, 12A through 12C, 15A through 15C, 18A through 18C, 21A through 21C and 24A through 24C show aberrations of the first through sixth embodiments, respectively, when the zoom lens system is in focus as to an object at infinity using the longest focal length. In the drawings indicating spherical aberrations, solid line d represents the spherical aberration with regard to the d-line, while dotted line SC represents the sine condition. In the drawings indicating astigmatisms, dotted line DM and solid line DS represent the astigmatisms on the meridional surface and the sagittal surface, respectively.

Although the present invention has been described and illustrated in detail, it is clearly understood that the same is by way of illustration and examples only and is not to be taken by way of limitation, the spirit and scope of the present invention being limited only by terms of the appended claims.

TABLE 1

| f = 39.00~66.28~112.42 | | | fT/fW = 2.88 | | | |
|---|---|---|---|---|---|---|
| FNO. = 3.57~6.07~10.29 | | | | | | |
| Radius | | Distance | Refractive index | | Abbe number | |
| r1* | 30.693 | d1 | 2.549 | N1 | 1.84506 | ν1 | 23.66 |
| r2* | 19.745 | d2 | 4.716 | | | | |
| r3 | 86.109 | d3 | 4.971 | N2 | 1.51823 | ν2 | 58.96 |
| r4 | −13.620 | d4 | 1.784 | | | | |
| r5 | INF | d5 | 16.846~7.997~2.804 | | | | |
| r6* | −58.665 | d6 | 3.441 | N3 | 1.52510 | ν3 | 56.38 |
| r7* | −29.248 | d7 | 5.098 | | | | |
| r8 | −12.108 | d8 | 1.147 | N4 | 1.71300 | ν4 | 53.93 |
| r9 | −63.788 | | | | | | |

Aspherical coefficient r 1

ε = 1.0000
A4 = −0.13881818 × D(−3)
A6 = −0.66851676 × D(−6)
A8 = 0.39837139 × D(−9)
A10 = 0.37909260 × D(−10)
A12 = −0.71984486 × D(−12)

r 6

ε = 1.0000
A3 = −0.13778319 × D(−3)
A4 = 0.14523620 × D(−3)
A5 = −0.31110873 × D(−4)
A6 = 0.36083467 × D(−5)
A7 = 0.83483415 × D(−7)
A8 = −0.22804377 × D(−7)
A9 = −0.17808179 × D(−8)
A10 = 0.18075323 × D(−9)
A11 = 0.10012814 × D(−10)
A12 = −0.92094139 × D(−12)
A13 = 0.15342468 × D(−15)
A14 = 0.25197592 × D(−15)
A15 = 0.38656385 × D(−16)
A16 = 0.43384380 × D(−17)

r 2

ε = 1.0000
A4 = −0.94535488 × D(−4)
A6 = −0.77143702 × D(−6)
A8 = 0.18131231 × D(−7)
A10 = −0.11276815 × D(−9)
A12 = −0.67650271 × D(−12)

r 7

ε = 1.0000
A3 = −0.13968546 × D(−3)
A4 = 0.59071111 × D(−4)
A5 = −0.83949530 × D(−5)
A6 = −0.14342690 × D(−6)
A7 = 0.62816253 × D(−7)
A8 = 0.26098631 × D(−7)
A9 = −0.41680040 × D(−9)
A10 = 0.82666120 × D(−10)
A11 = 0.98006969 × D(−11)
A12 = −0.86700682 × D(−12)
A13 = 0.42720625 × D(−13)

TABLE 2

| f = 36.35~49.28~67.43 | | | fT/fW = 1.86 | | | |
|---|---|---|---|---|---|---|
| FNO. = 3.62~4.91~6.72 | | | | | | |
| Radius | | Distance | Refractive index | | Abbe number | |
| r1* | 24.492 | d1 | 2.450 | N1 | 1.92248 | ν1 | 20.88 |
| r2* | 16.990 | d2 | 3.750 | | | | |
| r3 | 92.770 | d3 | 3.800 | N2 | 1.58913 | ν2 | 61.11 |
| r4 | −12.982 | d4 | 12.341~7.595~4.000 | | | | |
| r5* | −37.898 | d5 | 3.350 | N3 | 1.52510 | ν3 | 56.38 |
| r6 | −22.588 | d6 | 4.450 | | | | |
| r7 | −10.350 | d7 | 1.000 | N4 | 1.69680 | ν4 | 56.47 |
| r8 | −41.659 | | | | | | |

TABLE 2-continued

Aspherical coefficient r 1

ε = 1.0000
A4 = −0.25405213 × D(−3)
A6 = −0.12624317 × D(−5)
A8 = −0.18462206 × D(−8)
A10 = 0.34377056 × D(−10)

r 2

ε = 1.0000
A4 = −0.23195853 × D(−3)
A6 = −0.72322378 × D(−6)
A8 = 0.10437014 × D(−7)
A10 = 0.76243109 × D(−10)

r 5

ε = 1.0000
A3 = 0.29258116 × D(−4)
A4 = 0.48758947 × D(−4)
A5 = 0.24770911 × D(−5)
A6 = −0.10222139 × D(−6)
A7 = −0.44579524 × D(−7)
A8 = 0.28561957 × D(−7)
A9 = −0.21649707 × D(−8)
A10 = −0.14381362 × D(−10)
A11 = −0.16882466 × D(−11)
A12 = 0.69523861 × D(−12)

TABLE 3

| f = 35.80~55.00~102.80 | | | fT/fW = 2.87 | | | |
|---|---|---|---|---|---|---|
| FNO. = 4.60~5.50~9.40 | | | | | | |
| Radius | | Distance | Refractive index | | Abbe number | |
| r1* | 26.375 | d1 | 2.500 | N1 | 1.92248 | ν1 | 20.88 |
| r2* | 18.127 | d2 | 4.400 | | | | |
| r3 | 74.878 | d3 | 4.900 | N2 | 1.51763 | ν2 | 53.47 |
| r4 | −13.208 | d4 | 18.622~10.938~4.275 | | | | |
| r5* | −37.055 | d5 | 3.300 | N3 | 1.52510 | ν3 | 56.38 |
| r6* | −22.864 | d6 | 4.880 | | | | |
| r7 | −11.633 | d7 | 1.000 | N4 | 1.77250 | ν4 | 49.77 |
| r8 | −42.323 | | | | | | |

Aspherical coefficient r 1

ε = 1.0000
A4 = −0.15485050 × D(−3)
A6 = −0.80285000 × D(−6)
A8 = 0.37916167 × D(−8)
A10 = 0.45141001 × D(−10)
A12 = −0.18750895 × D(−11)

r 5

ε = 1.0000
A3 = −0.28556609 × D(−3)

A4 = 0.18935560 × D(−3)
A5 = −0.40178570 × D(−4)
A6 = 0.48400045 × D(−5)
A7 = 0.94608235 × D(−7)
A8 = −0.46102655 × D(−7)
A9 = −0.71891077 × D(−9)
A10 = 0.31732571 × D(−9)
A11 = 0.73022533 × D(−11)
A12 = −0.17633573 × D(−11)
A13 = 0.33841061 × D(−15)
A14 = 0.59365870 × D(−15)
A15 = 0.97281019 × D(−16)
A16 = 0.11661900 × D(−16)

r 2

ε = 1.0000
A4 = −0.12356275 × D(−3)
A6 = −0.73232319 × D(−6)
A8 = 0.22696484 × D(−7)
A10 = −0.19490629 × D(−9)
A12 = −0.10299568 × D(−11)
A14 = 0.30846068 × D(−14)
A16 = 0.15134404 × D(−16)

r 6

ε = 1.0000
A3 = −0.30357157 × D(−3)
A4 = 0.10308121 × D(−3)
A5 = −0.13487968 × D(−4)
A6 = −0.25488330 × D(−6)
A7 = 0.43955091 × D(−7)
A8 = 0.54688162 × D(−7)
A9 = −0.79663427 × D(−8)
A10 = 0.14037371 × D(−10)
A11 = 0.34733023 × D(−10)
A12 = −0.39109740 × D(−12)
A13 = −0.65279800 × D(−13)

TABLE 4

| f = 39.12~55.00~112.70 | | | fT/fW = 2.88 | | | |
|---|---|---|---|---|---|---|
| FNO. = 4.60~5.50~9.40 | | | | | | |
| Radius | | Distance | Refractive index | | Abbe number | |
| r1* | 28.588 | d1 | 2.500 | N1 | 1.92248 | ν1 | 20.88 |
| r2* | 19.267 | d2 | 4.400 | | | | |
| r3 | 62.389 | d3 | 4.900 | N2 | 1.51763 | ν2 | 53.47 |
| r4 | −13.818 | d4 | 17.394~11.592~4.275 | | | | |
| r5* | −38.469 | d5 | 3.300 | N3 | 1.52510 | ν3 | 56.38 |
| r6* | −23.353 | d6 | 4.880 | | | | |
| r7 | −10.527 | d7 | 1.000 | N4 | 1.71300 | ν4 | 53.93 |
| r8 | −37.697 | | | | | | |

TABLE 4-continued

Aspherical coefficient

| r 1 | r 2 |
|---|---|
| $\epsilon$ = 1.0000 | $\epsilon$ = 1.0000 |
| A4 = −0.15819960 × D(−3) | A4 = −0.12968030 × D(−3) |
| A6 = −0.62891468 × D(−6) | A6 = −0.60624689 × D(−6) |
| A8 = 0.45081049 × D(−8) | A8 = 0.24034124 × D(−7) |
| A10 = 0.48280037 × D(−10) | A10 = −0.18970549 × D(−9) |
| A12 = −0.18573952 × D(−11) | A12 = −0.10194745 × D(−11) |
| r 5 | A14 = 0.30711966 × D(−14) |
| $\epsilon$ = 1.0000 | A16 = 0.14867138 × D(−16) |
| A3 = −0.25108199 × D(−3) | r 6 |
| A4 = 0.19994239 × D(−3) | $\epsilon$ = 1.0000 |
| A5 = −0.40573203 × D(−4) | A3 = −0.24549862 × D(−3) |
| A6 = 0.47522067 × D(−5) | A4 = 0.92761299 × D(−4) |
| A7 = 0.87073871 × D(−7) | A5 = −0.14237671 × D(−4) |
| A8 = −0.46485825 × D(−7) | A6 = −0.28057472 × D(−6) |
| A9 = −0.71508157 × D(−9) | A7 = 0.43586084 × D(−7) |
| A10 = 0.32203717 × D(−9) | A8 = 0.54211192 × D(−7) |
| A11 = 0.82479530 × D(−11) | A9 = −0.81915879 × D(−8) |
| A12 = −0.16128747 × D(−11) | A10 = −0.54162610 × D(−11) |
| A13 = 0.33841061 × D(−15) | A11 = 0.35699098 × D(−10) |
| A14 = 0.59365870 × D(−15) | A12 = −0.90115909 × D(−13) |
| A15 = 0.97281019 × D(−16) | A13 = −0.74856860 × D(−13) |
| A16 = 0.11661900 × D(−16) | |

TABLE 5 f = 39.12~66.40~112.70    fT/fW = 2.88
FNO. = 4.60~6.60~9.40

| | Radius | | Distance | Refractive index | | Abbe number |
|---|---|---|---|---|---|---|
| r1* | 29.470 | d1 | 2.500 | N1 | 1.84506 | ν1 | 23.66 |
| r2* | 19.213 | d2 | 4.400 | | | |
| r3 | 66.597 | d3 | 4.900 | N2 | 1.51823 | ν2 | 58.96 |
| r4 | −13.720 | d4 | 17.481~9.171~4.275 | | | |
| r5* | −38.251 | d5 | 3.300 | N3 | 1.52510 | ν3 | 56.38 |
| r6* | −23.278 | d6 | 4.880 | | | |
| r7 | −10.531 | d7 | 1.000 | N4 | 1.69680 | ν4 | 56.47 |
| r8 | −39.448 | | | | | |

Aspherical coefficient

| r 1 | r 2 |
|---|---|
| $\epsilon$ = 1.0000 | $\epsilon$ = 1.0000 |
| A4 = −0.16317927 × D(−3) | A4 = −0.12743823 × D(−3) |
| A6 = −0.65704021 × D(−6) | A6 = −0.59661075 × D(−6) |
| A8 = 0.43111817 × D(−8) | A8 = 0.24140226 × D(−7) |
| A10 = 0.47029825 × D(−10) | A10 = −0.18884792 × D(−9) |
| A12 = −0.18644185 × D(−11) | A12 = −0.10142869 × D(−11) |
| r 5 | A14 = 0.30974242 × D(−14) |
| $\epsilon$ = 1.0000 | A16 = 0.14984081 × D(−16) |
| A3 = −0.25655234 × D(−3) | r 6 |
| A4 = 0.20002440 × D(−3) | $\epsilon$ = 1.0000 |
| A5 = −0.40528325 × D(−4) | A3 = −0.24627092 × D(−3) |
| A6 = 0.47570355 × D(−5) | A4 = 0.92983603 × D(−4) |
| A7 = 0.87401961 × D(−7) | A5 = −0.14205630 × D(−4) |
| A8 = −0.46474424 × D(−7) | A6 = −0.27903202 × D(−6) |
| A9 = −0.71582188 × D(−9) | A7 = 0.43608490 × D(−7) |
| A10 = 0.32183045 × D(−9) | A8 = 0.54054820 × D(−7) |
| A11 = 0.82192802 × D(−11) | A9 = −0.81915406 × D(−8) |
| A12 = −0.16161553 × D(−11) | A10 = −0.31066538 × D(−11) |
| A13 = 0.33841061 × D(−15) | A11 = 0.35971098 × D(−10) |
| A14 = 0.59365870 × D(−15) | A12 = −0.85324018 × D(−13) |
| A15 = 0.97281019 × D(−16) | A13 = −0.78903396 × D(−13) |
| A16 = 0.11661900 × D(−16) | |

TABLE 6 f = 36.05~60.90~102.80    fT/fW = 2.85
FNO. = 4.60~6.60~9.40

| | Radius | | Distance | Refractive index | | Abbe number |
|---|---|---|---|---|---|---|
| r1* | 27.316 | d1 | 2.500 | N1 | 1.84506 | ν1 | 23.66 |
| r2* | 18.179 | d2 | 4.400 | | | |
| r3 | 70.772 | d3 | 4.900 | N2 | 1.51823 | ν2 | 58.96 |
| r4 | −13.396 | d4 | 18.495~9.559~4.275 | | | |
| r5* | −36.674 | d5 | 3.300 | N3 | 1.52510 | ν3 | 56.38 |
| r6* | −22.729 | d6 | 4.880 | | | |
| r7 | −11.301 | d7 | 1.000 | N4 | 1.71300 | ν4 | 53.93 |
| r8 | −47.101 | | | | | |

Aspherical coefficient

| r 1 | r 2 |
|---|---|
| $\epsilon$ = 1.0000 | $\epsilon$ = 1.0000 |
| A4 = −0.15858204 × D(−3) | A4 = −0.12162416 × D(−3) |
| A6 = −0.81657214 × D(−6) | A6 = −0.72785983 × D(−6) |
| A8 = 0.37509731 × D(−8) | A8 = 0.22702527 × D(−7) |
| A10 = 0.45036176 × D(−10) | A10 = −0.19490730 × D(−9) |
| A12 = −0.18753427 × D(−11) | A12 = −0.10300080 × D(−11) |
| r 5 | A14 = 0.30842552 × D(−14) |
| $\epsilon$ = 1.0000 | r 6 |
| A3 = −0.27877733 × D(−3) | $\epsilon$ = 1.0000 |
| A4 = 0.19040225 × D(−3) | A3 = −0.30124288 × D(−3) |
| A5 = −0.40101250 × D(−4) | A4 = 0.10251088 × D(−3) |
| A6 = 0.48439051 × D(−5) | A5 = −0.13542640 × D(−4) |
| A7 = 0.94745787 × D(−7) | A6 = −0.25884745 × D(−6) |
| A8 = −0.46109612 × D(−7) | A7 = 0.43681722 × D(−7) |
| A9 = −0.72220467 × D(−9) | A8 = 0.54232429 × D(−7) |
| A10 = 0.31661180 × D(−9) | A9 = −0.79162069 × D(−8) |
| A11 = 0.71756035 × D(−11) | A10 = 0.19583317 × D(−10) |
| A12 = −0.17834296 × D(−11) | A11 = 0.34849603 × D(−10) |
| A13 = 0.33841061 × D(−15) | A12 = −0.43564070 × D(−12) |
| A14 = 0.59365870 × D(−15) | A13 = −0.73742945 × D(−13) |
| A15 = 0.97281019 × D(−16) | |
| A16 = 0.11661900 × D(−16) | |

What is claimed is:

1. A zoom lens system comprising, from the object side, a front lens unit having two lens elements with an airspace therebetween and a positive refractive power; and a rear lens unit having a negative refractive power, and that performs zooming by changing the spatial distance between the front lens unit and the rear lens unit; wherein said rear lens unit includes, from the object side, a positive lens made of resin and a negative lens, at least one surface of said positive lens being aspherical, wherein said front lens unit consists of two lens elements, and wherein said zoom lens system meets the following conditions;

νd>40
nd>1.5

$$\frac{f\tau}{fw} > 1.8$$

where
νd: the Abbe number of the positive lens of the rear lens unit to the d-line;
nd: the refractive index of the positive lens of the rear lens unit;
fτ: the focal length of the entire zoom lens system in the longest focal length condition; and
fw: the focal length of the entire zoom lens system in the shortest focal length condition.

2. The zoom lens system as claimed in claim 1 wherein said front lens unit includes a lens closest to the object having a convex surface.

3. The zoom lens system as claimed in claim 1 wherein said front lens unit includes a lens having two aspherical surfaces.

4. The zoom lens system as claimed in claim 1 wherein said front lens unit comprises a negative lens and a positive lens aligned in that order from the object side.

5. The zoom lens system as claimed in claim 1 wherein said zoom lens system meets the following conditions;

νd>50 where,

νd: the Abbe number of the positive lens of the rear lens unit to the d-line.

6. A zoom lens system comprising, from the object side, a front lens unit having two lens elements with an airspace therebetween and a positive refractive power, and a rear lens unit having a negative refractive power, and that performs zooming by changing the spatial distance between the front lens unit and the rear lens unit;

wherein said rear lens unit includes, from the object side, a positive lens made of resin and negative lens, at least one surface of said positive lens being aspherical, and wherein said zoom lens system meets the following conditions;

νd>40 nd>1.5

$$\frac{f\tau}{fw} > 2.6$$

where

νd: the Abbe number of the positive lens of the rear lens unit of the d-line;

nd: the refractive index of the positive lens of the rear lens unit;

ƒτ: the focal length of the entire zoom lens system in the longest focal length condition; and ƒw: the focal length of the entire zoom lens system in the shortest focal length condition.

7. The zoom lens system as claimed in claim 6 wherein said front lens unit includes a lens closest to the object having a convex surface.

8. The zoom lens system as claimed in claim 6 wherein said front lens unit includes a lens having both surfaces aspherical.

9. The zoolll lens system as claimed in claim 6 wherein said front lens unit comprises a negative lens and a positive lens aligned in that order from the object side.

10. The zoom lens system as claimed in claim 6 wherein said zoom lens system meets the following condition;

νd>50 where

νd: the Abbe number of the positive lens of the rear lens unit to the d-line.

11. A zoom lens system that comprises, from the object side, a front lens unit having two lens elements with an airspace therebetween a positive refractive power and a rear lens unit having a negative refractive power; and that performs zooming by changing the spatial distance between the front lens unit and the rear lens unit;

wherein said rear lens unit includes, from the object side, a positive lens and negative lens, at least one surface of said positive lens being aspherical, and wherein said positive lens included is made of resin which fulfills the following conditions;

νd>40 nd>1.5 where

νd the Abbe number of the resin; lens and nd: the refractive index of the resin.

12. The zoom lens system as claimed in claim 11 wherein said resin lens fulfills the following condition;

νd>50 where

νd: the Abbe number of the resin lens.

* * * * *